(12) United States Patent
Chen et al.

(10) Patent No.: US 11,905,021 B2
(45) Date of Patent: Feb. 20, 2024

(54) REPAIR SYSTEM FOR PLANETARY EXPLORATION PARACHUTE

(71) Applicant: SOOCHOW UNIVERSITY, Suzhou (CN)

(72) Inventors: Tao Chen, Suzhou (CN); Xuyan Hou, Suzhou (CN); Yongbin Wang, Yihuai (CN); Jiali Yu, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 18/026,010

(22) PCT Filed: Oct. 24, 2022

(86) PCT No.: PCT/CN2022/126991
§ 371 (c)(1),
(2) Date: Mar. 13, 2023

(87) PCT Pub. No.: WO2023/184946
PCT Pub. Date: Oct. 5, 2023

(65) Prior Publication Data
US 2023/0322394 A1 Oct. 12, 2023

(30) Foreign Application Priority Data
Mar. 26, 2022 (CN) .......................... 202210308261.4

(51) Int. Cl.
*B64D 17/02* (2006.01)
*B64F 5/40* (2017.01)

(52) U.S. Cl.
CPC ................ *B64D 17/02* (2013.01); *B64F 5/40* (2017.01)

(58) Field of Classification Search
CPC ........ B64D 17/00; B64D 17/02; B64D 21/00; B64G 1/62
See application file for complete search history.

(56) References Cited

U.S. PATENT DOCUMENTS

| 4,224,810 | A | * | 9/1980 | Crowell | .................. | D06F 31/00 |
| | | | | | | 68/3 R |
| 4,293,862 | A | * | 10/1981 | Beavers | .................. | B29C 73/32 |
| | | | | | | 343/872 |
| 4,313,291 | A | * | 2/1982 | Crowell | .................. | D06F 31/00 |
| | | | | | | 8/150 |

(Continued)

FOREIGN PATENT DOCUMENTS

| CN | 208110079 U | 11/2018 |
| CN | 111516883 A | 8/2020 |

(Continued)

*Primary Examiner* — Joshua J Michener
*Assistant Examiner* — Ryan Andrew Yankey
(74) *Attorney, Agent, or Firm* — SZDC Law PC

(57) ABSTRACT

An embodiment of the present invention discloses a repair system for a planetary exploration parachute. The repair system includes a folding piece and a fuse, the fuse is provided in the folding piece, a sensing signal for reflecting an impact force of dust is received by the fuse, fusing is generated in the fuse when the sensing signal is greater than a preset threshold, and the folding piece is changed from a folded state to an unfolded state after the fusing is generated in the fuse, so as to automatically repair a damaged part of the parachute.

10 Claims, 2 Drawing Sheets

(56) References Cited

U.S. PATENT DOCUMENTS

| | | | |
|---|---|---|---|
| 11,278,091 B1 * | 3/2022 | McKinney | ............. A45B 25/18 |
| 2016/0001887 A1 | 1/2016 | Liao | |

FOREIGN PATENT DOCUMENTS

| CN | 111572782 A | | 8/2020 | |
|---|---|---|---|---|
| CN | 111516883 B | * | 8/2021 | ............. B64D 17/02 |
| CN | 111572782 B | * | 9/2021 | ............. B64D 17/02 |
| CN | 114655444 A | | 6/2022 | |
| CN | 114671030 A | | 6/2022 | |
| CN | 114777975 A | | 7/2022 | |

* cited by examiner

REPAIR SYSTEM FOR PLANETARY EXPLORATION PARACHUTE

This application is the National Stage Application of PCT/CN2022/126991, filed on Oct. 24, 2022, which claims priority to Chinese Patent Application No. 202210308261.4, filed on Mar. 26, 2022, which is incorporated by reference for all purposes as if fully set forth herein.

FIELD OF THE DISCLOSURE

The present invention relates to the field of near-earth exploration technologies, and particularly to a repair system for a planetary exploration parachute.

BACKGROUND OF THE DISCLOSURE

In recent years, near-earth exploration becomes a popular exploration task. Since a planetary atmospheric environment has characteristics of dryness and a large diurnal temperature variation, extreme weather, such as a sand storm, or the like, often exists near the ground surface. Under an action of a strong wind, dry and loose planetary surface soil particles may rise to several kilometers or even dozens of kilometers, and dense dust aerosol is formed on the planetary surface. In a near-earth planetary exploration process, dust particles moving at a high speed may randomly impact a surface of a parachute of a probe to damage a structure of a parachute body, thus seriously threatening safety of the parachute.

Currently, a prior art CN111516883 A discloses a framework-closed damaged-part high-altitude-repairable parachute structure and a method. A parachute has a magnetic parachute division structure, a wind pressure sensor and a first-access structure, and closed repair of a damaged region of the parachute can be realized; however, for the repair system, a switch is required to be manually switched on by a user as required, and certain limitation exists in near-earth space exploration.

Therefore, in view of the above-mentioned technical problem, it is necessary to provide a repair system for a planetary exploration parachute, which can automatically start a repair action as required.

SUMMARY OF THE DISCLOSURE

In view of this, in order to solve the above problem, an object of an embodiment of the present invention is to provide a repair system for a planetary exploration parachute.

A repair system for a planetary exploration parachute, comprising:

a connector configured to fix the repair system to a parachute body of the parachute;

a folding piece configured to repair a damaged part of the parachute, the folding piece having a folded state and an unfolded state, and an initial state of the folding piece being the folded state;

a repair rod, the connectors being fixed to two ends of the repair rod respectively, and the folding piece being provided between the two repair rods; and a fuse provided in the folding piece, the fuse being configured to receive a sensing signal and generate fusing when the sensing signal is greater than a preset threshold, and the folding piece being changed from the folded state to the unfolded state after the fusing is generated in the fuse.

The present invention has the following advantages.

The repair system for a planetary exploration parachute according to the embodiment of the present invention includes the folding piece and the fuse, the fuse is provided in the folding piece, the sensing signal for reflecting impact strength of dust is received by the fuse, fusing is generated when the sensing signal is greater than the preset threshold, and the folding piece is changed from the folded state to the unfolded state after the fusing is generated in the fuse, so as to automatically repair the damaged part of the parachute.

REFERENCE NUMERALS

Figure 1:
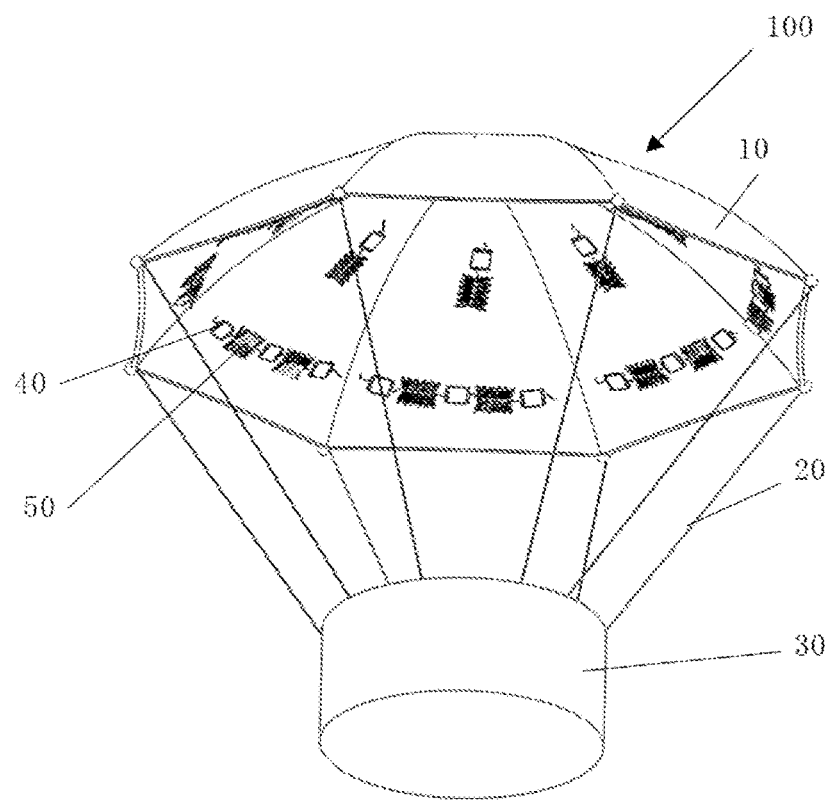
FIG. 1 is a perspective structural view of a parachute system for planetary exploration in an embodiment of the present invention.

100. Parachute system for planetary 10. Parachute body 20. Connecting exploration portion 30. Landing portion 40. Sensor 50. Repair system 513. Wire 51. Connector 53. Folding piece 52. Repair rod 54. Fuse 511. Pin shaft 512. Insulating layer 521. Through hole 523. Through part 541. Protective 542. Spring 544. Safety wire 543. Electrode sleeve

DETAILED DESCRIPTION OF PREFERRED EMBODIMENTS

FIG. 1 shows a schematic perspective structural diagram of a parachute system for planetary exploration in an embodiment of the present invention. In this embodiment, the parachute system 100 for planetary exploration includes a parachute, a sensor 40 and a repair system 50. The parachute includes a parachute body 10, a landing portion 30, and a connecting portion 20 for connecting the parachute body and the landing portion. In a specific embodiment, the landing portion 30 is configured as a near-earth probe, and the connecting portion 20 is configured as a connecting cord. The sensor 40 is provided on the parachute body 10 and configured to detect an impact force of dust to generate a sensing signal. The repair system 50 is provided on the parachute body 10 and electrically connected to the sensor 40, and the repair system 50 performs a repair action based on the sensing signal generated by the sensor 40.

Figure 2:
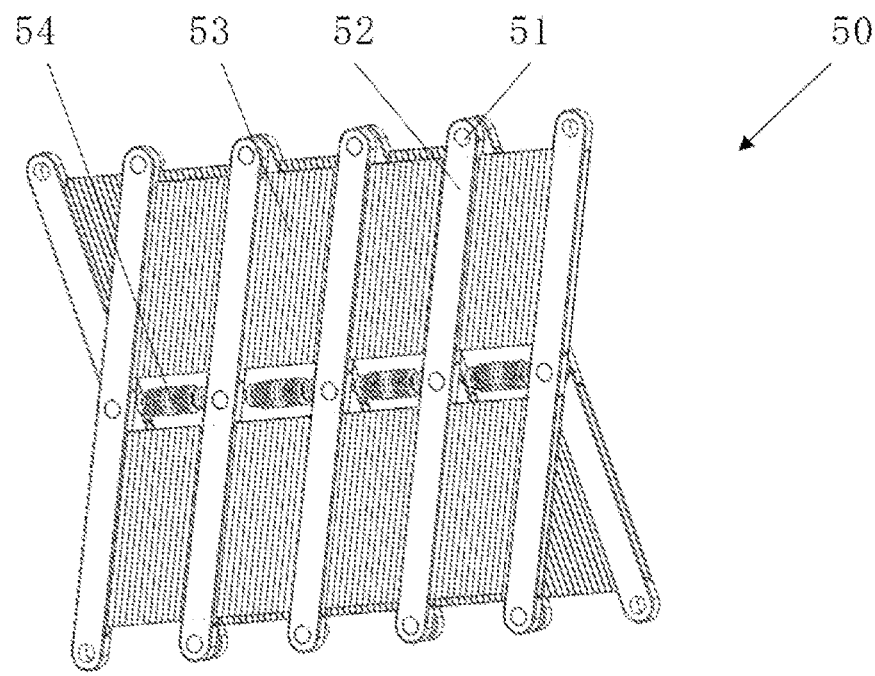
FIG. 2 is a schematic perspective structural diagram of a repair system according to an embodiment of the present invention.

FIG. 2 shows a schematic perspective structural diagram of a repair system according to an embodiment of the present invention. The repair system 50 includes a connector 51, a repair rod 52, a folding piece 53, and a fuse 54. The connector 51 is configured to fix the repair system 50 to the parachute body 10 of the parachute. The folding piece 53 is configured to repair a damaged part of the parachute; the folding piece 53 has a folded state and an unfolded state, and an initial state of the folding piece 53 is the folded state. The connectors 51 are fixed to two ends of the repair rod 52 respectively, and the folding piece 53 is provided between the two repair rods 53. The fuse 54 is provided in the folding piece 53, the fuse 54 is configured to receive the sensing signal generated by the sensor 40 and generate fusing when the sensing signal is greater than a preset threshold, and the folding piece 53 is changed from the folded state to the unfolded state after the fusing is generated in the fuse 54.

Figure 3:
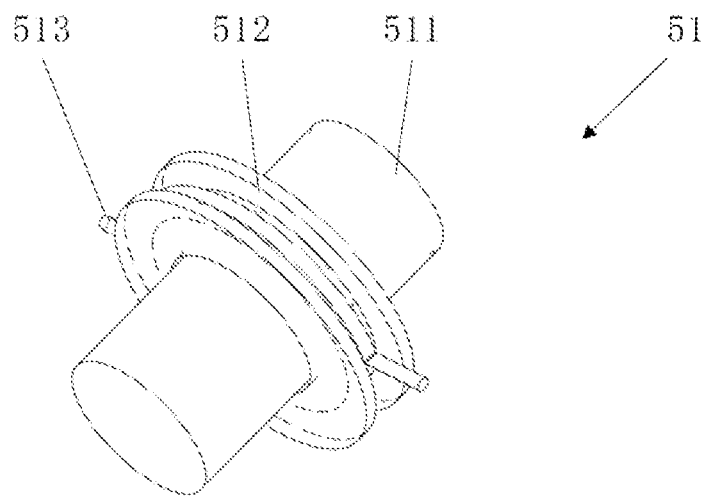
FIG. 3 is a schematic perspective structural diagram of a connector of the repair system according to the embodiment shown in FIG. 2.

As shown in FIG. 3, in this embodiment, the connector 51 includes a pin shaft 511, an insulating sleeve 512, and a wire 513. The pin shaft 511 is configured to be fixed to the parachute body 10 of the parachute. The pin shaft 511 is sleeved with the insulating sleeve 512, and the insulating sleeve 512 is provided with a groove (not shown). The insulating sleeve 512 is made of a rubber material, and the groove is formed in a middle of the insulating sleeve to accommodate the wire 513. The wire 513 is provided in the groove, one end of the wire 513 is connected to the sensor 40 generating the sensing signal, and the other end of the wire 513 is connected to the fuse 54.

Figure 4:
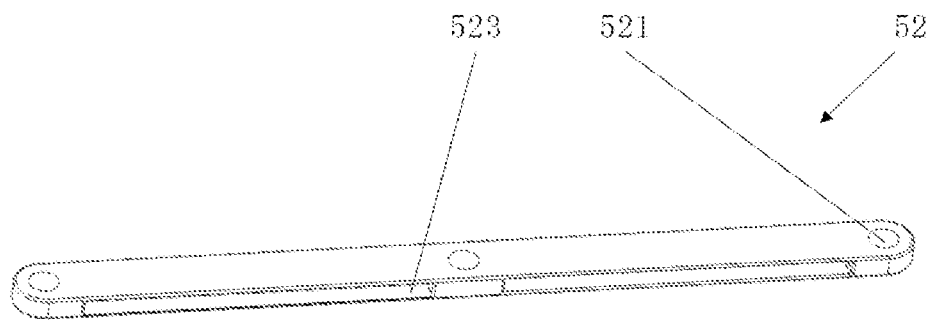
FIG. 4 is a schematic perspective structural diagram of a repair rod of the repair system according to the embodiment shown in FIG. 2.

As shown in FIG. 4, in this embodiment, each of the two ends of the repair rod 52 is provided with a through hole 521, and the connector 51 is inserted into the through hole 521. Specifically, a diameter of the pin shaft 511 is the same as a diameter of the through hole 521, and the pin shaft 511 and the through hole 521 are fitted with each other. A length of the pin shaft 511 is greater than a thickness of a body of the repair rod 52, and preferably, the length of the pin shaft 511 is three times the thickness of the body of the repair rod 52. A part of the body of the repair rod 52 is through and may be defined as a through part 523. The through part 523 is configured to store the folding piece 53. The repair rod 52 is flexible and can be made of thermoplastic-based aramid fiber reinforced composite material, such that overall flexibility of the parachute is not affected.

The initial state of the folding piece 53 is the folded state, and a folded part is formed. After the fusing is generated in the fuse 54, the folding piece 53 automatically unfolds the folded part to repair the damaged part of the parachute body. Preferably, the folding piece 53 is made of a material consistent with a material of a canopy of the parachute, thereby enabling the repaired parachute to have consistency.

Figure 5:
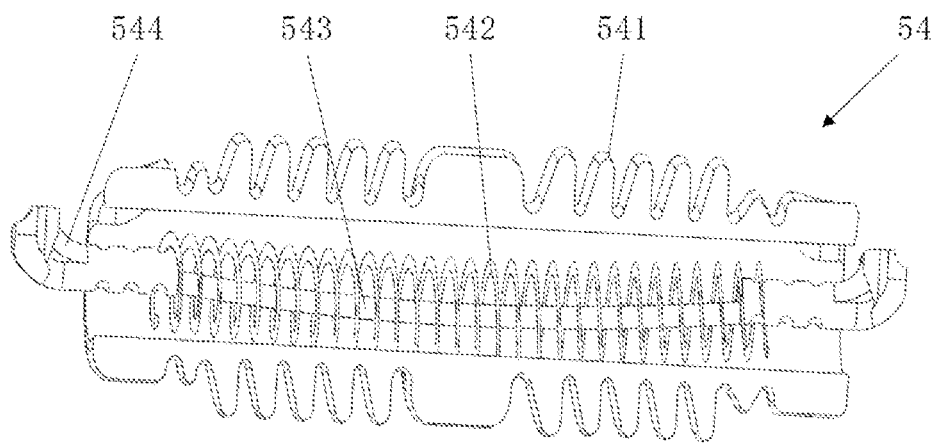
FIG. 5 is a schematic perspective structural diagram of a fuse of the repair system according to the embodiment shown in FIG. 2.

As shown in FIG. 5, the fuse 54 includes a protective sleeve 541, a spring 542, a safety wire 544, and an electrode 543. The protective sleeve 541 is made of an insulating material and has a hollow passage. The spring 542 is provided in the hollow passage; the spring 542 has a compressed state and a natural state, and an initial state of the spring 542 is the compressed state. Curvature of the spring 542 is consistent with curvature of the parachute body of the parachute, such that the repair system can be flexibly unfolded in a repair process to be better consistent with the parachute body of the parachute. The safety wire 544 is inserted into the hollow passage of the spring 542. The electrode 543 is provided at an end of the safety wire 544 and electrically connected to the safety wire 544. Preferably, the safety wire is a fused-type safety wire. Curvature of the safety wire is consistent with the curvature of the parachute body of the parachute, such that the repair system can be flexibly unfolded in the repair process to be better consistent with the parachute body of the parachute. When the parachute body is not impacted by the dust, the spring 542 is in the compressed state, and the spring 542 is restrained by the protective sleeve 541 and the safety wire 544.

In this embodiment, the repair system 50 performs the repair action based on electrical excitation, and closed-loop real-time self-repair may be realized. Further, for the repair system 50, a rated signal of the fuse 54 may be set according to a specific planetary exploration task and conditions of the canopy of the parachute, a relevant preset threshold may be obtained, and different tasks and varying scenarios may be adapted.

When the sensor 40 is impacted by dust particles, a pulse voltage is generated. According to a performance test of the parachute, an impact energy threshold which can be borne by a parachute canopy structure in the near-earth space exploration can be obtained, and then, a pulse voltage threshold of the sensor 40 may be calculated. Rated voltages or rated currents of the safety wires used in different parachutes for near-earth surface exploration are determined according to the pulse voltage thresholds.

When the parachute is impacted by the dust to cause the canopy structure to be damaged, the sensor 40 generates a pulse voltage exceeding the preset threshold, a current corresponding to the pulse voltage is transmitted to the fuse 54 through the wire 513, the safety wire 544 in the fuse 54 is fused, and the spring 542 is released to generate transverse tension. Under an action of the spring 542, the repair rod 52 rotates around the connector 51, the folded part of the folding piece 53 is unfolded, and the canopy between connecting rods is also unfolded. The repair rods 52 guarantee overall structural strength of the damaged parachute body of the parachute, and the folding piece 53 between the repair rods 52 can fill up a damaged hole of the canopy, thereby realizing the self-repair of the parachute.

What is claimed is:

1. A repair system for a planetary exploration parachute, comprising:
   a plurality of connectors, each connector configured to fix the repair system to a parachute body of the parachute;
   a plurality of folding pieces, each folding piece configured to repair a damaged part of the parachute, the folding piece having a folded state and an unfolded state, and an initial state of the folding piece being the folded state;
   a plurality of repair rods, the connectors being fixed to two ends of each repair rod respectively, at least two of the plurality of repair rods being adjacent, and the folding piece being provided between the two adjacent repair rods; and
   a plurality of fuses, each fuse provided in the folding piece, the fuse being configured to receive a sensing signal and generate fusing when the sensing signal is greater than a preset threshold, and the folding piece being changed from the folded state to the unfolded state after the fusing is generated in the fuse.

2. The repair system for a planetary exploration parachute according to claim 1, wherein the connector comprises:
   a pin shaft configured to be fixed to the parachute body of the parachute;
   an insulating sleeve with which the pin shaft is sleeved, the insulating sleeve being provided with a groove; and
   a wire provided in the groove, one end of the wire being connected to a sensor generating the sensing signal, and the other end of the wire being connected to the fuse.

3. The repair system for a planetary exploration parachute according to claim 1, wherein through holes are provided in the two ends of the repair rod, and the connector is inserted into the through hole.

4. The repair system for a planetary exploration parachute according to claim 1, wherein a part of a body of the repair rod is hollow, and the hollow part of the repair rod is configured to store the folding piece.

5. The repair system for a planetary exploration parachute according to claim 1, wherein the repair rod has toughness.

6. The repair system for a planetary exploration parachute according to claim 1, wherein the fuse comprises:
- a protective sleeve provided with a hollow passage;
- a spring provided in the hollow passage, the spring having a compressed state and a natural state, and an initial state of the spring being the compressed state;
- a safety wire inserted into the hollow passage of the spring; and
- an electrode provided at an end of the safety wire and electrically connected to the safety wire.

7. The repair system for a planetary exploration parachute according to claim 6, wherein the protective sleeve is made of an insulating material.

8. The repair system for a planetary exploration parachute according to claim 6, wherein curvature of the spring is consistent with curvature of the parachute body of the parachute.

9. The repair system for a planetary exploration parachute according to claim 6, wherein the safety wire is a fused-type safety wire.

10. The repair system for a planetary exploration parachute according to claim 6, wherein curvature of the safety wire is consistent with the curvature of the parachute body of the parachute.

\* \* \* \* \*